(12) United States Patent
Hirata et al.

(10) Patent No.: US 6,739,890 B2
(45) Date of Patent: May 25, 2004

(54) CARD CONNECTOR ASSEMBLY WITH IMPROVED EJECTION DEVICE

(75) Inventors: Hideyuki Hirata, Kanagawa (JP); Masami Sasao, Kanagawa (JP); Mikiji Tanaka, Kanagawa (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/257,523

(22) PCT Filed: Apr. 12, 2001

(86) PCT No.: PCT/US01/12015
§ 371 (c)(1),
(2), (4) Date: Apr. 7, 2003

(87) PCT Pub. No.: WO01/80373
PCT Pub. Date: Oct. 25, 2001

(65) Prior Publication Data
US 2004/0067668 A1 Apr. 8, 2004

(30) Foreign Application Priority Data
Apr. 12, 2000 (JP) ............................. 2000-110703

(51) Int. Cl.[7] .............................................. H01R 13/62
(52) U.S. Cl. ............................................... 439/159
(58) Field of Search .............................. 439/159, 160

(56) References Cited

U.S. PATENT DOCUMENTS

| | | | | |
|---|---|---|---|---|
| 5,989,045 A | * | 11/1999 | Kimura | 439/159 |
| 6,036,513 A | * | 3/2000 | Nishioka | 439/159 |
| 6,089,891 A | * | 7/2000 | Nishioka | 439/159 |
| 6,113,403 A | * | 9/2000 | Oguchi | 439/159 |
| 6,142,801 A | * | 11/2000 | Koseki et al. | 439/159 |
| 6,155,853 A | * | 12/2000 | Kajiura | 439/159 |
| 6,394,828 B1 | * | 5/2002 | Kodama et al. | 439/159 |
| 6,482,020 B1 | * | 11/2002 | Yeh | 439/159 |
| 6,520,784 B2 | * | 2/2003 | Ito et al. | 439/159 |

FOREIGN PATENT DOCUMENTS

| | | | |
|---|---|---|---|
| EP | 0936580 | * | 8/1999 |
| JP | 11297417 | * | 10/1999 |

* cited by examiner

*Primary Examiner*—Gary Paumen
*Assistant Examiner*—James R. Harvey
(74) *Attorney, Agent, or Firm*—Stacey E. Caldwell

(57) ABSTRACT

A card connector assembly for receiving a card member is provided with an eject device wherein the eject device is assembled directly onto the support frame of the card connector assembly to thereby reduce the number of components, the number of assembly steps and the resultant manufacturing costs of the connector assembly. The card connector assembly comprises a card guide portion (5a), a connector portion (9) to be connected to the card member, a support frame (3) continuous with both the card guide portion and the connector portion and an eject device (2). The eject device (2) comprises a slide member (22) slidably movable along the support frame (3), a movable lever (35) operating in accordance with movement of the slide member (22) for moving the card in a direction away from the card connector (7), and a cam mechanism (10) for defining the sliding range of the slide member (22). A part of the cam mechanism (10) is provided directly in the support frame (3).

3 Claims, 11 Drawing Sheets

CARD CONNECTOR ASSEMBLY WITH IMPROVED EJECTION DEVICE

BACKGROUND OF THE INVENTION

The present invention relates to a card connector assembly for receiving a card device such as a PC card and more particularly to a card connector assembly provided with an eject device wherein the eject device is assembled directly into a support frame of the connector assembly thereby reducing the number of components of the connector assembly and the resultant assembly and manufacturing costs.

Card connectors equipped with eject devices are known. One example is disclosed in Japanese Patent Application Laid-Open No. Hei 11-219756. In this card connector, as shown in FIG. 10, a card 300 is loaded, and unloaded in a direction indicated by the arrow. An eject device 302 that is connected to a release lever 301 is actuated when the card is to be ejected. FIG. 11 is a perspective view of this connector, showing an overview of eject device 302. FIG. 12 is an exploded perspective view of eject device 302. As is apparent from these figures, eject device 302 is formed into a cartridge and therefore after the eject device 302 is assembled as a cartridge, it is fixed to a support frame 304 of the connector. As shown in FIG. 12, eject device 302 is composed of a case 305, a cover 306, an eject lever 307, a push button 308, a coil spring 310, a spring 311 and a contact plate 309. A reception groove 312 for push button 308 and a fixture groove 313 for fixing case 305 to support frame 304 are provided in case 305. The rest of the components including push button 308 are assembled to case 302. After being assembled, the eject device 305 is fixed to support frame 304 by utilizing fixture groove 313.

In such a conventional card connector, since eject device 302 is of a cartridge type, it is possible to assemble the eject device in a separate step, as a separate assembly process. Thus, it is possible to assemble or retrofit eject device 302 to support frame 304 if and when an eject device is required.

On the other hand, because this known eject device 302 is structured as a separate cartridge, many (seven) components are used, which increase the cost of manufacture this structure as well as the labor required to assemble it together.

SUMMARY OF THE INVENTION

A general object of the present invention is to provide a card connector assembly in which an eject device may be directly assembled onto a support frame, to thereby decrease the number of components and correspondingly reduce the overall cost of the connector assembly by reducing the manufacturing, inventory and assembly costs.

According to the present invention, a card connector assembly for receiving a card member such as a PC card comprises a card guide portion, connector portions including a card connector and a substrate connector, a support frame continuous with both the card guide portion and the connector portions, and an eject device, wherein the eject device comprises a slide member provided movably along the support frame, a movable lever operating in accordance with movement of the slide member for moving the card in a direction away from the card connector, and a cam mechanism for defining the sliding range of the slide member, wherein a portion of the cam mechanism is provided directly on the support frame.

The support frame is provided with a guide groove for the slide member extending in a direction of movement of the slide member and a card guide portion extending in a direction of movement of the card. This arrangement effectively utilizes the support frame as an integral component in the eject device.

The cam mechanism includes a cam groove provided directly in the support frame, a pin plate having a pin for movement within the cam groove, a spring member for biasing the pin plate toward the cam groove, and a coil spring for biasing the slide plate to a retracted position. With such an arrangement, it is possible to simplify the structure of the cam mechanism.

A holder portion retains the pin plate such that the pin plate is angularly movable within the cam groove in a defined range. This arrangement eliminates the connection between the pin plate and the slide member, thereby further simplifying the structure of the cam mechanism.

A reception recess for receiving the coil spring is provided in the slide member. This arrangement facilitates the assembly of the coil spring into the slide member and allows the eject device as a whole to be formed into a relatively compact structure.

A rib portion having a surface substantially parallel to the surface of an inserted card is provided on a side surface of the support frame, and the cam groove is provided in the surface of the rib portion. The cam groove is provided in the surface of the rib portion so that the card connector assembly not only has a reduced number of components, but can be made thinner overall as well.

The eject device functions such that the pin plate moves in accordance with the retraction and advancement of the slide member, and the cam groove comprises a first cam groove for defining the advanced position of the pin plate, a second cam groove for defining the retraction position of the pin plate, and a third cam groove continuous with the first and second cam grooves for defining a lock position of the pin plate. The lock position of the pin plate is set after the card has been ejected to prevent misinsertion of a card after ejection.

It is preferable that the support frame is made of a molded plastic resin so that the guide grooves for the slider member and the card guide portions are formed as part of the support frame during the molding process. Furthermore, since the support frame is made of resin, conductive terminals for the connector portion can be assembled directly onto the support frame. This arrangement also enhances manufacturing efficiency and the ultimate reduction in manufacturing costs.

Thus, according to the present invention, the eject device is directly assembled within the arm portion of the support frame so that it is possible to eliminate extraneous components such as are used in prior art eject devices. As a result, the number of components of the connector assembly is reduced, thereby correspondingly reducing the number of assembly steps, and the resultant manufacturing costs of the connector assembly.

Other objects and advantages of the present invention will be understood from the following description of a card connector assembly according to the preferred embodiment of the present invention, which are shown in the accompanying drawings.

BRIEF DESCRIPTION OF THE DRAWINGS

The features of the invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
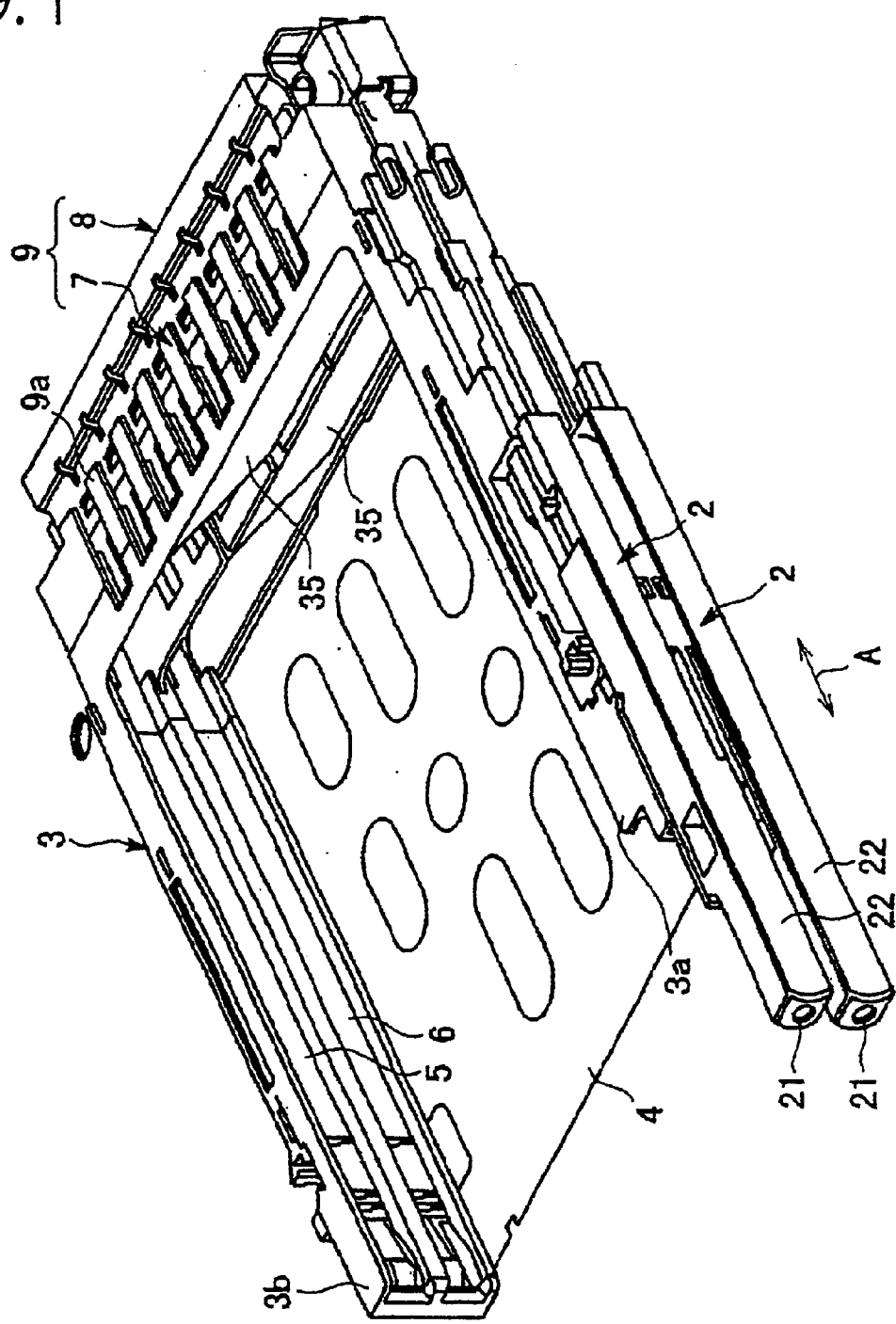
FIG. 1 is a perspective view of a card connector assembly according to one embodiment of the present invention.
Figure 2:
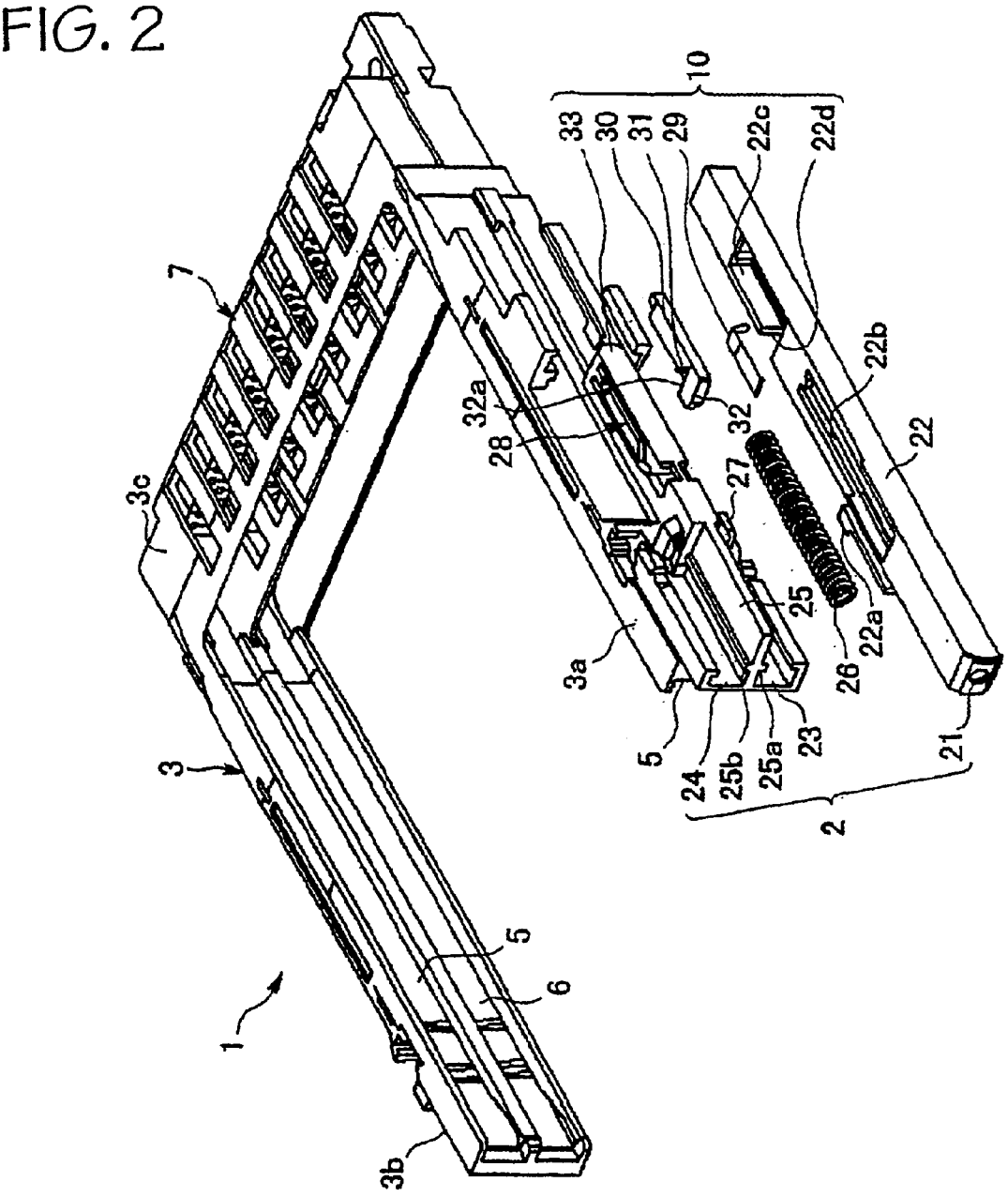
FIG. 2 is a partially exploded perspective view of the card connector assembly according to the present invention.

One embodiment of the present invention is shown in FIG. 1, which illustrates a two-stage PC card connector assembly for receiving a card member such as a PC card and equipped with a card eject device 2. FIG. 2 is an exploded perspective view of the basic structure of the card connector assembly 1.

Card connector assembly 1 is substantially rectangular as shown in FIG. 1. The connector assembly 1 is a two-stage or dual port type and therefore two card eject devices 2 are similarly arranged in the upper and lower stages or upper and lower ports. The connector body comprises a substantially U-shaped support frame 3 as shown in FIG. 2. Metal shells 4 (only one being shown in FIG. 1) are provided for covering upper and lower portions of support frame 3. Support frame 3 is preferably fabricated of a molded plastic resin.

Support frame 3 includes arm portions 3a and 3b extending parallel to one another and a bight portion 3c therebetween. Card guide portions 5 and 6 are provided in opposing inner side surfaces of arm portions 3a and 3b to guide cards into engagement with the card connector assembly. These card guide portions 5 and 6 are formed to facilitate guiding and extend in the longitudinal direction of arm portions 3a and 3b.

A connector portion 9 includes a card connector 7 for making mechanical and electrical contact with corresponding contacts (not shown) of a respective card, and a substrate connector 8 connected to the substrate (not shown) are provided in bight portion 3c. Terminals 9a of connector portion 9 are mounted directly into bight portion 3c.

Eject device 2 is assembled directly onto an outer portion of one of the arm portions 3a of support frame 3. Eject device 2 includes a slide member 22 slidably mounted in guide grooves 23 and 24 of arm portion 3a of the support frame, a push-button 21 integrally formed on one end of the slide member, a movable lever 35 pivotably mounted on the support frame for ejecting the card and moving the card in a direction away from card connector 7 in response to actuation and movement of slide member 22, and a cam mechanism 10 for defining the sliding range of slide member 22. Guide grooves 23 and 24 extend in the direction of movement of the slide member and a partitioning rib 25 is provided therebetween as shown in FIG. 2. A portion of cam mechanism 10 is provided directly on arm portion 3a.

For the sake of clarity, a single eject device 2 will be described in the following description. Slide member 22 is a rectangular member having an integral push button 21 and is movable in a back-and-forth direction indicated by arrow A (FIG. 1) within guide groove 23. Means for preventing slide member 22 from laterally detaching or disengaging from guide groove 23 is provided between the side portion of arm portion 3a and slide member 22 in the form of rail-like convex portions 25a and 25b extending in the longitudinal direction of the guide groove and formed on an upper and a lower surface of partitioning rib 25, and a projection piece 22a provided on slide member 22 engages with convex portion 25a.

A coil spring 26 for biasing slide member 22 is assembled between slide member 22 and arm portion 3a. Coil spring 26 is received in a reception recess 22b provided in slide member 22. One end of coil spring 26 abuts a wall surface of reception recess 22b and the other end abuts a stopper 27 provided in arm portion 3a. hus, when slide member 22 is pushed in, coil spring 26 is compressed, thus generating a counter repulsive force in an opposing direction.

Looking now at FIGS. 3–9 in conjunction with FIG. 2, cam mechanism 10 is composed of a cam groove 28 provided in arm portion 3a of support fame 3, a pin plate 30 having a pin 31 adapted to be inserted into and movable within cam groove 28, a holder or recess portion 22c provided in slide member 22 for holding pin plate 30 angularly movable within a defined range, and a leaf spring 29 mounted in holder portion 22c for pushing pin plate 30 toward cam groove 28. A head portion 32 is provided at one end of pin plate 30 proximate pin 31. An opening 22d exposing a portion of head portion 32 of pin plate 30 is located in front of the holder portion.

The size and shape of holder portion 22c is configured so that pin 31 of pin plate 30 is movable within cam groove 28. It is also possible to form the slide member integral with the slide plate.

The location of cam groove 28 contributes to the overall thin profile of the card connector assembly. That is, a rib portion 33 having a flat surface substantially parallel to the surface of an inserted card is provided on a side surface of arm portion 3a, and cam groove 28 is provided on the surface of rib portion 33. In FIG. 2, the upper stage cam groove 28 is shown. A cam groove 28 is also provided on the lower surface of rib portion 33. (FIG. 3).

Cam groove 28 includes a first cam groove 281 defining an advanced position of pin plate 30, a second cam groove 282 defining a retracted position of pin plate 30 and a third cam groove 283 continuous with the first and second cam grooves for defining a tentative lock position of pin plate 30. The third cam groove allows a lock position of pin plate 30 to be set after the ejection of a card.

Figure 3:
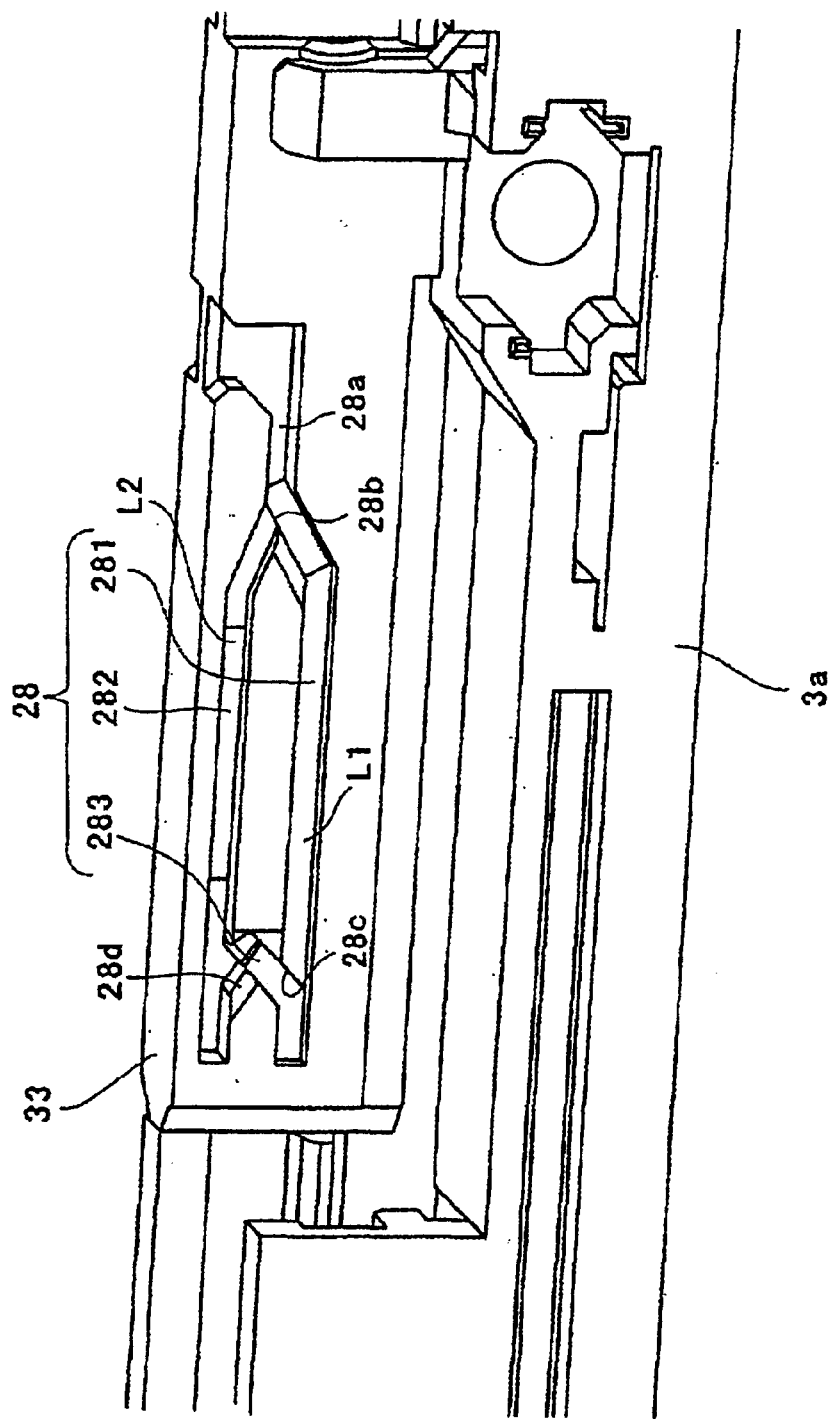
FIG. 3 is an enlarged perspective view of a cam groove used in the card connector assembly of the invention.

As shown in FIG. 3, first cam groove 281 and second cam groove 282 correspond to a GO path LI and RETURN path L2, respectively. Pin 31 of pin plate 30 is set so that in the advanced position it is kept in a start end 28a portion of the first cam groove 281 in the retracted position of the slide plate.

Figure 4:
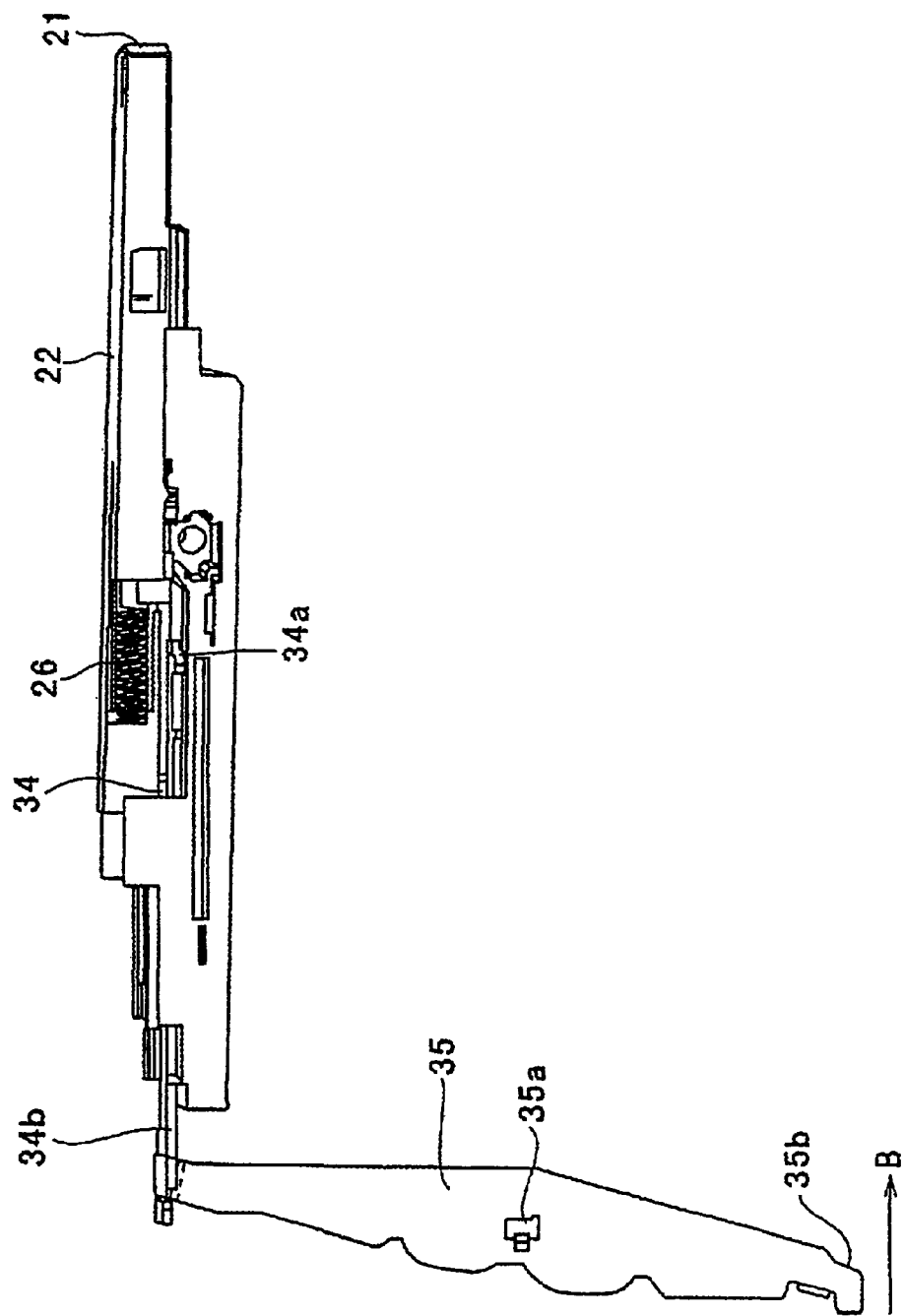
FIG. 4 is a plan view showing an eject device in accordance with the present invention.

Since pin plate 30 is held within holder portion 22c of slide member 22, pin plate 30 moves with the retraction and advancement of the slide member. As shown in FIG. 4, a rod 34 for operating a movable lever 35 is disposed within arm portion 3a to move relative to the movement of pin plate 30. One end 34b of rod 34 is coupled by way of a hinge to movable lever 35. Lever 35 is assembled in support frame 3 so as to be rotatable about a pivot portion 35a. When pin 31 of pin plate 30 is in the advanced position of cam groove 28, the other end 34a of rod 34 is set to abut a jaw portion 32a of head portion 32. The amount of slide movement by slide member 22 determines at what point abutment occurs. However, to provide some slack in the movement, when the slide member 22 is in the retracted position (the position shown in FIG. 1), a small amount of clearance is provided between jaw portion 32a of head portion 32 and end 34a of rod 34.

The eject operation of the card by eject device 2 will now be described. FIGS. 5–9 illustrate the movement of cam mechanism 10 in sequence during the card ejection operation.

Figure 5:
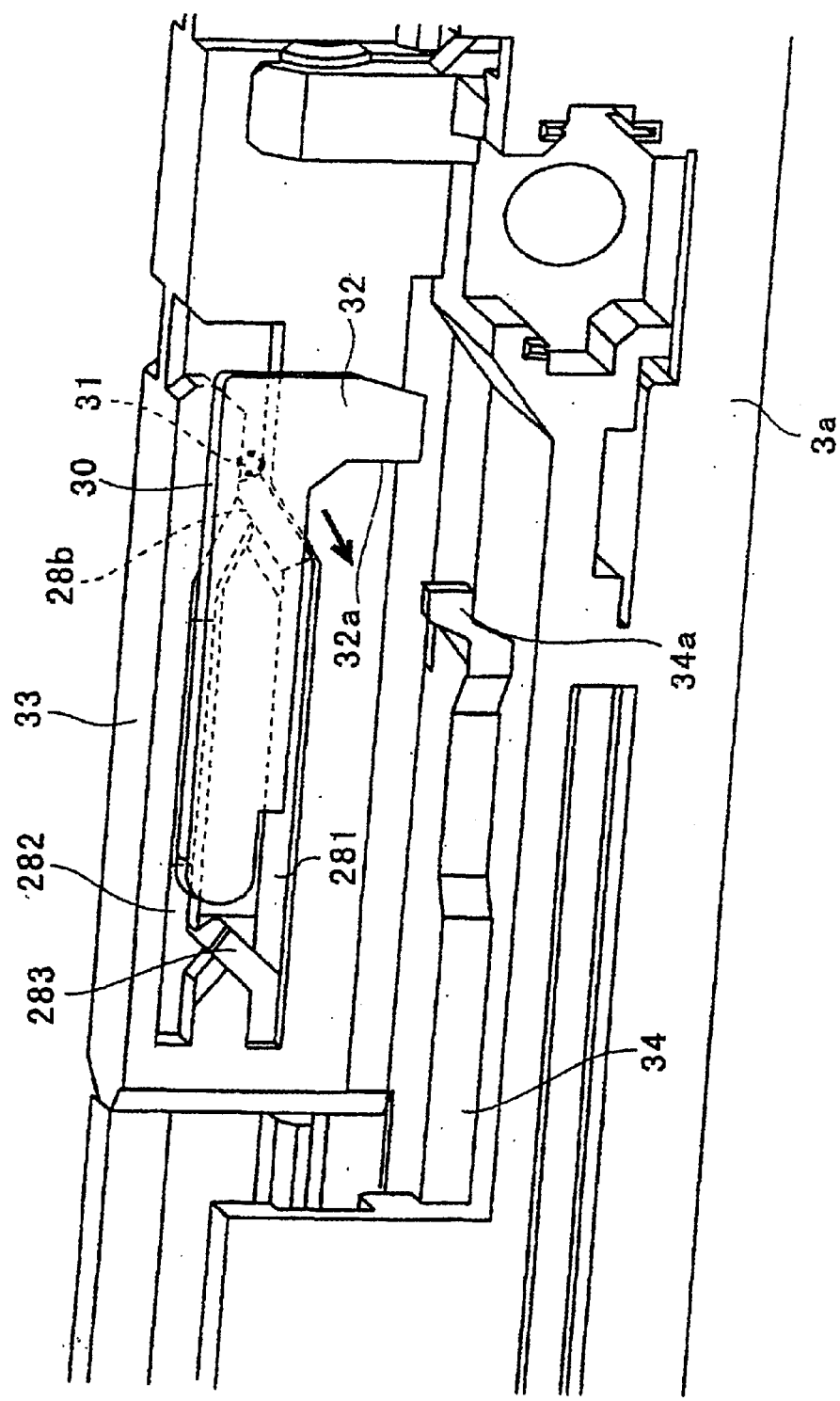
FIG. 5 is an operational illustration of the cam mechanism of the invention.

FIG. 5 corresponds to an initial position of slide member 22 where the card has not yet been inserted or just after the card has been inserted. In this case, slide member 22 is moved to the retracted position by coil spring 26, as shown in FIG. 1.

Figure 6:
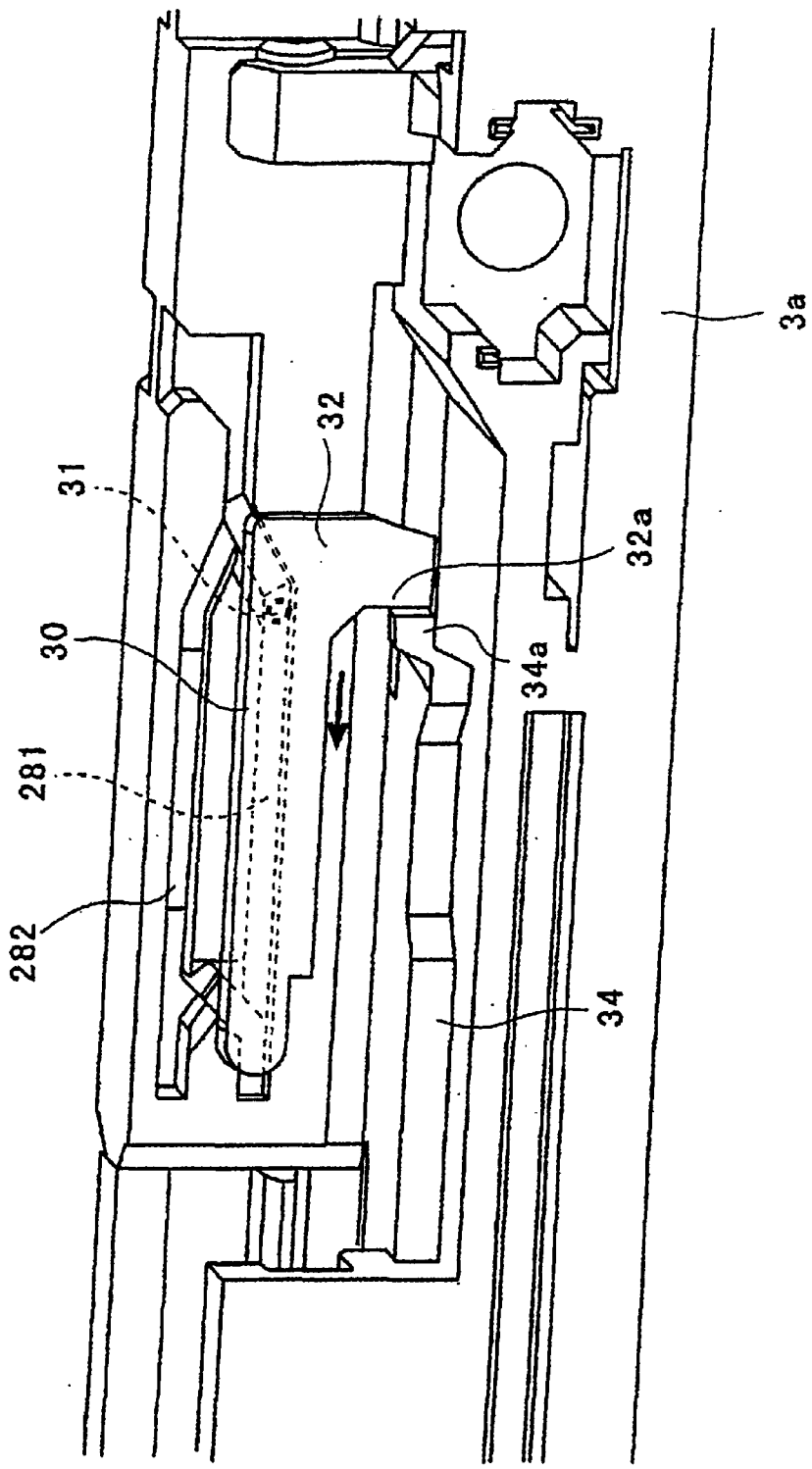
FIG. 6 is an operational illustration of the cam mechanism of the invention.

After the card has been inserted, the contacts of the card and terminals 9a of card connector 7 are electrically connected. Under this condition, when push button 21 is pushed and slide member 22 is advanced, pin plate 30 correspondingly advances with the movement of slide member 22. At this time coil spring 26 is compressed. Furthermore, pin 31 of pin plate 30 is prevented from moving toward second cam groove 282 due to the presence of a stepped surface 28b. As a result, pin 31 moves along first cam groove 281 (i.e. the GO path LI), and jaw portion 32a of head portion 32 abuts end 34a of rod 34 as shown in FIG. 6.

Figure 7:
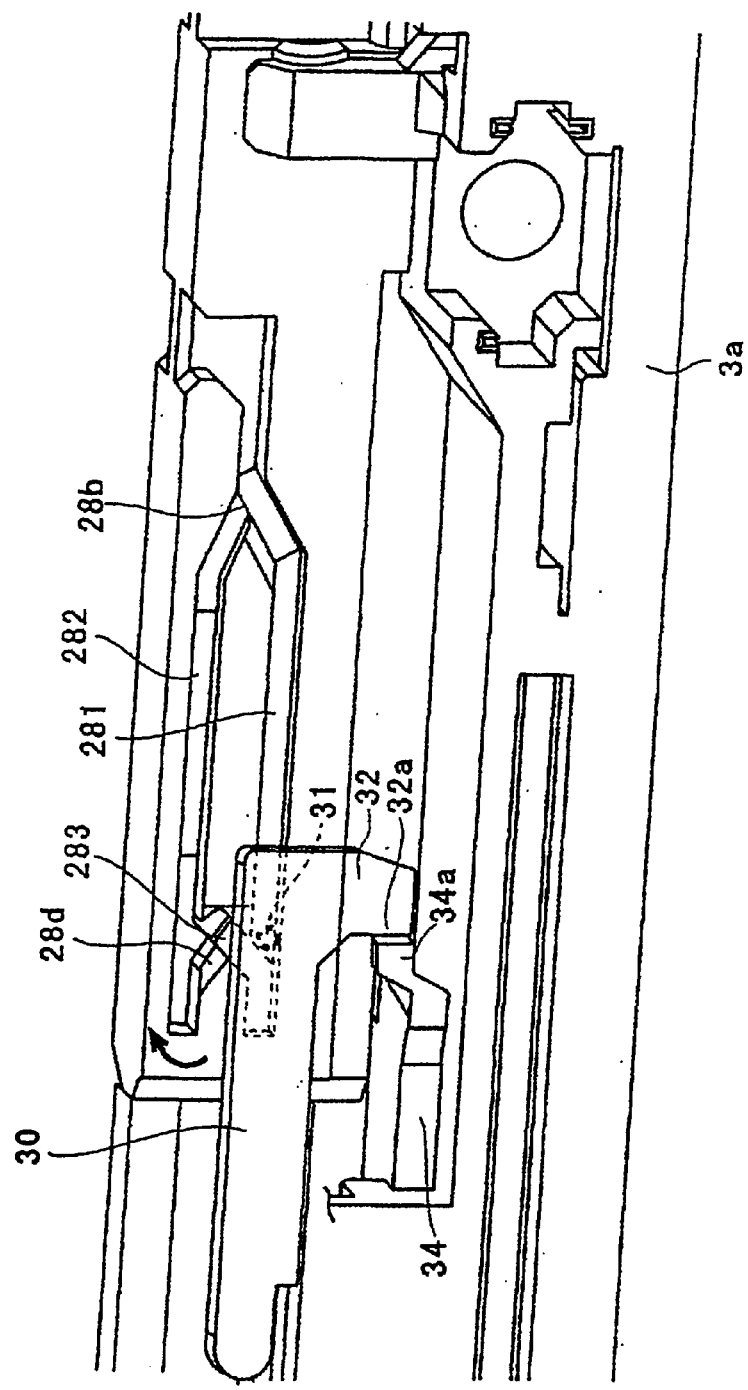
FIG. 7 is an operational illustration of the cam mechanism in accordance with the invention.

As slide member 22 moves forward and coil spring 26 is compressed, pin 31 of pin plate 30 moves along first cam groove 281 to push rod 34 as shown in FIG. 7. As a result, movable lever 35 is rotated in the direction indicated by arrow B about pivot portion 35a, the end portion of the card is pushed by free end 35b and the card is ejected. At this point, pin 3 passes through stepped surface 28c to prevent the return of the pin. Also under this condition, the contacts of the card and terminals 9a of card connector 7 move out of the electrical contact and the card is ejected.

Figure 8:
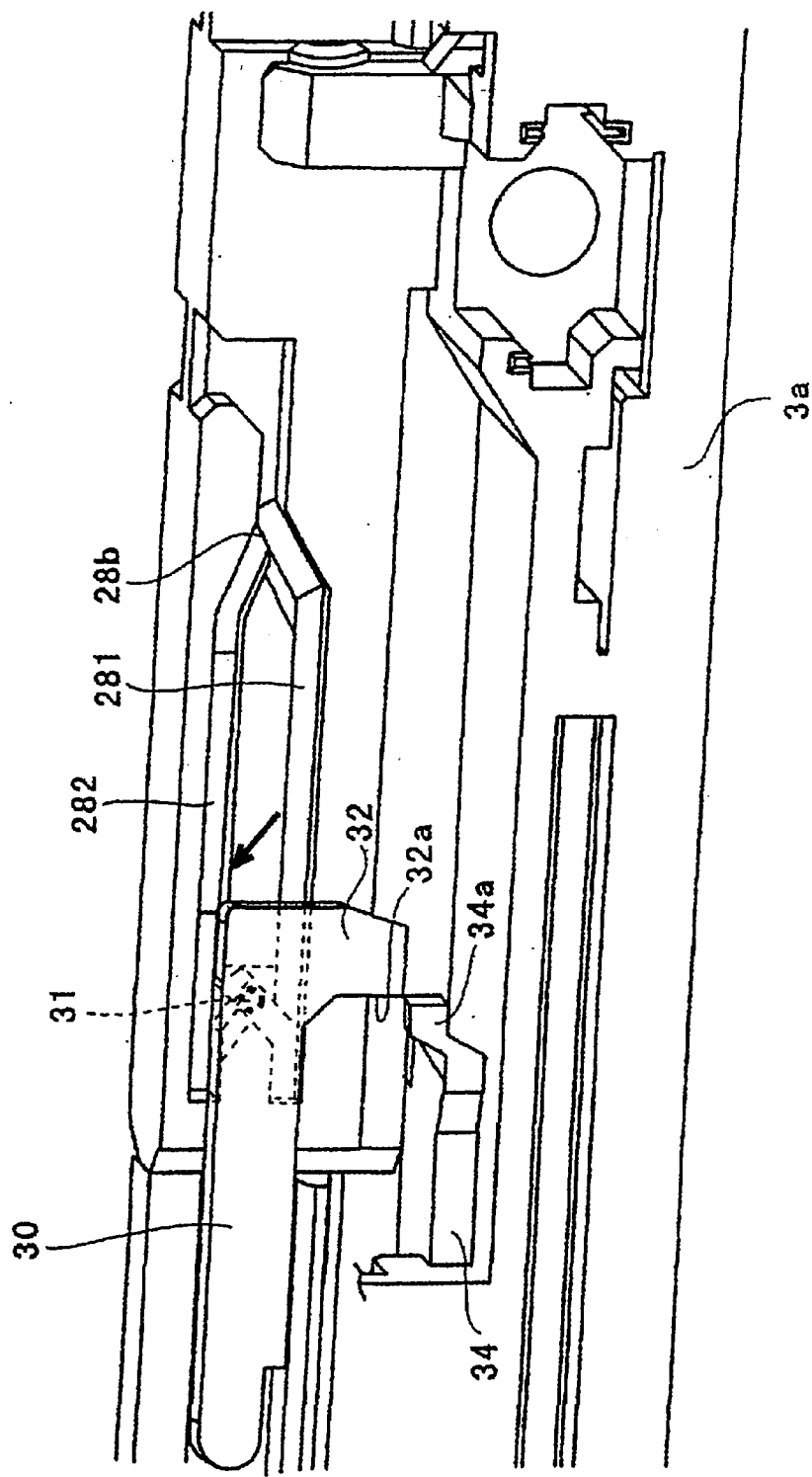
FIG. 8 is an operational illustration of the cam mechanism in accordance with the invention.
Figure 9:
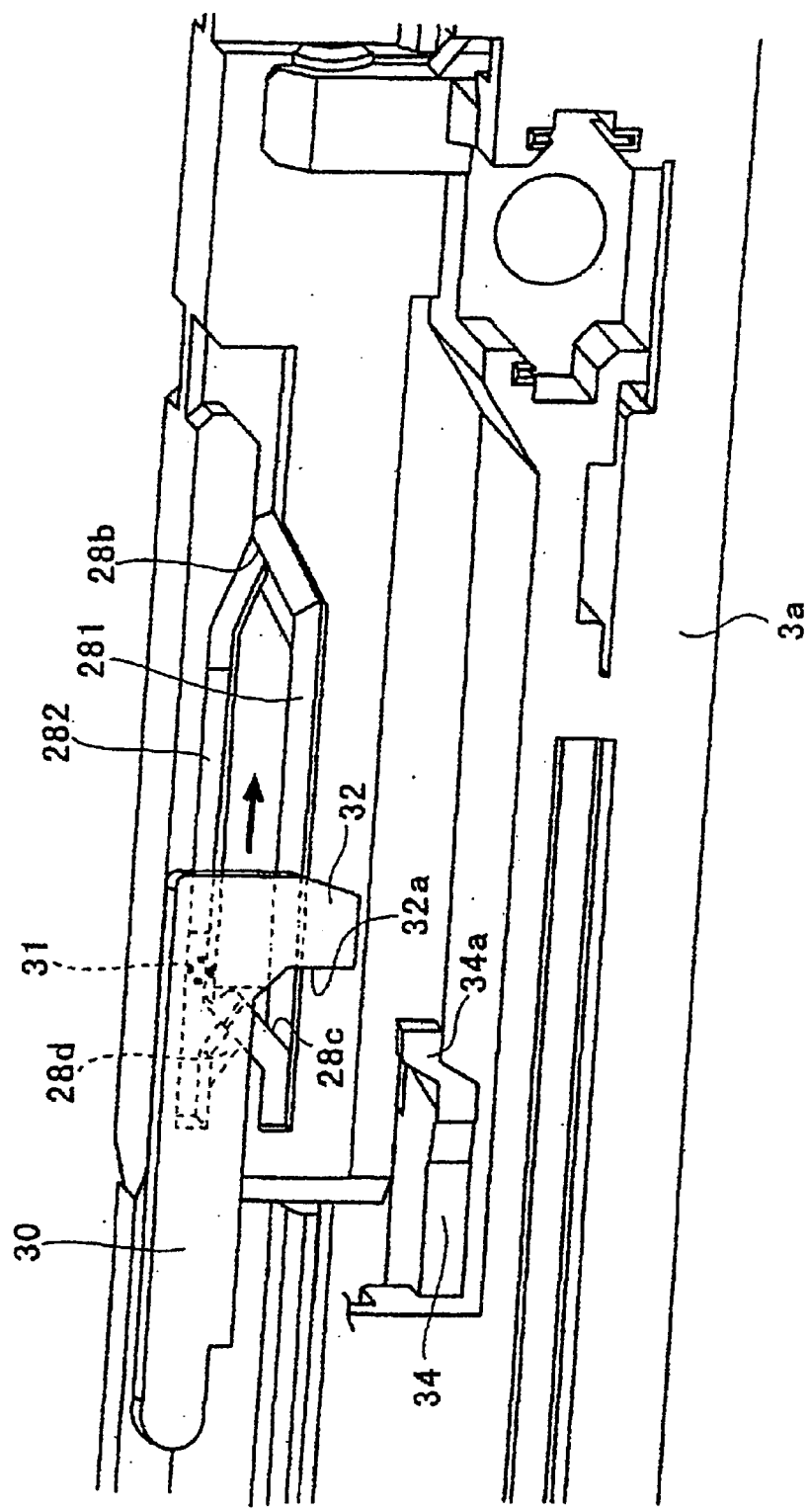
FIG. 9 is an operational illustration of the cam mechanism of the invention.
Figure 10:
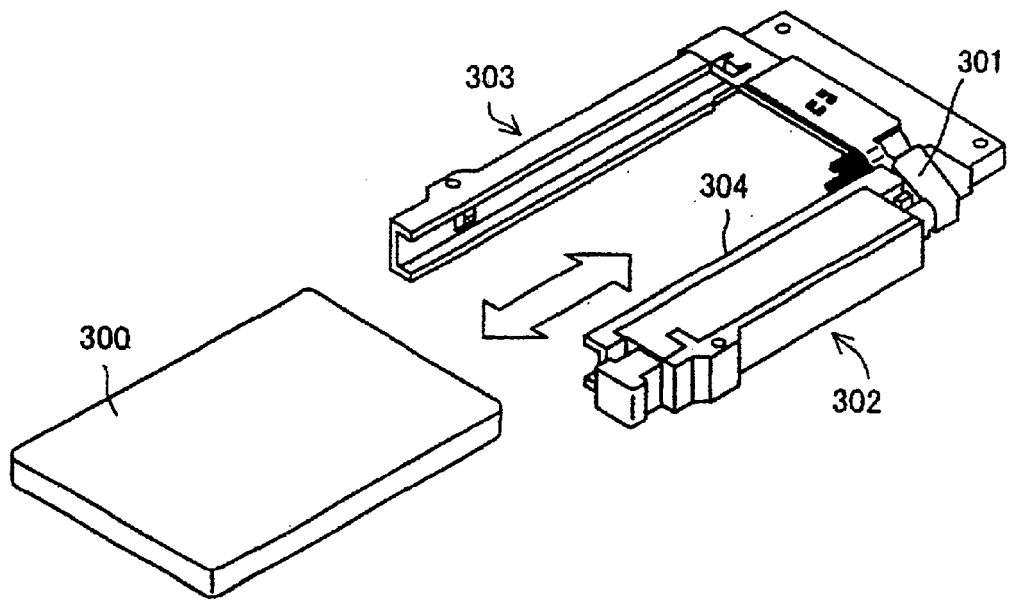
FIG. 10 is a perspective view showing a known card connector assembly.
Figure 11:
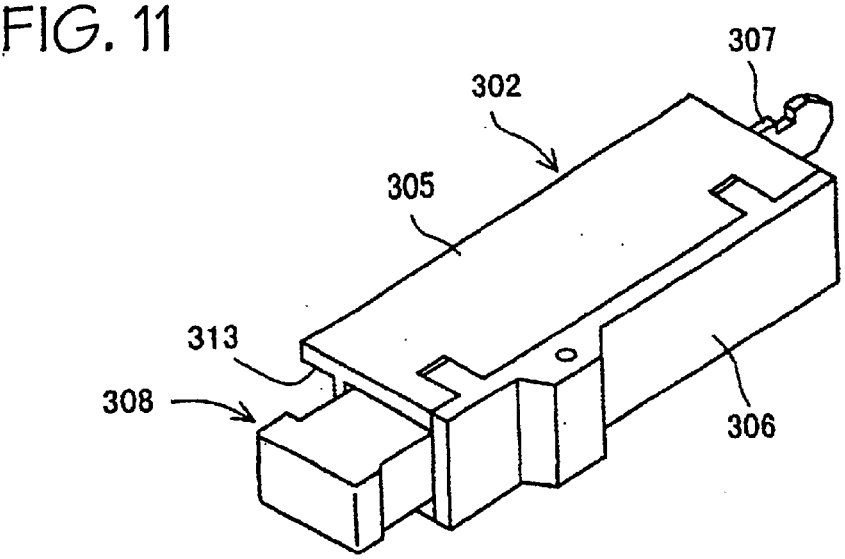
FIG. 11 is an overview of an ejection device used on known card connector.
Figure 12:
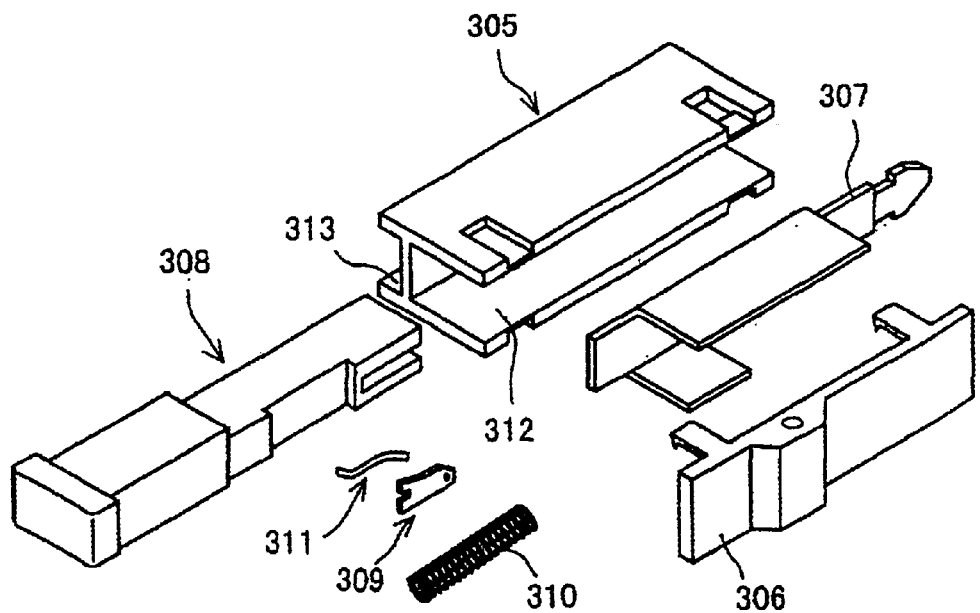
FIG. 12 is an exploded perspective view of the ejection device of the known card connector of FIG. 10.

When the movement of slide member 22 is stopped, slide member 22 moves rearwardly together with pin plate 30 due to the force of compressed coil spring 26. Stepped surface 28c prevents the return of pin 31 and causes pin 31 to move from first cam groove 281 to third cam groove 283 (FIG. 8). At this time, the engagement between jaw portion 32a of head portion 32 of pin plate 30 and end 34a of rod 34 is released. Accordingly, this is the eject or release condition of the card.

When slide member 22 is to be returned to its original position (shown in FIG. 1), slide member 22 is again pushed and advanced. This causes slide member 22 and pin 31 to move toward second cam groove 282 through a return-preventing stepped portion 28d of third cam groove 283. Under this condition, when movement of slide member 22 is stopped, slide member 22 moves in the retraction direction by the counter or repulsive force of coil spring 26. Accordingly, pin 31 moves back to its original position (FIG. 5) through second cam groove 282 (i.e. the RETURN path L2).

The invention therefore provides a simplified, yet mechanically efficient card connector assembly for ejecting a card therefrom. That is, eject device 2 is directly assembled onto arm portion 3a of support frame 3 so that slide member 22 itself can also function as a cover. Therefore components such as a case or a cover are eliminated that were previously needed for the cartridge-type eject device. As a result, in the present invention the number of component parts is reduced, along with the number of assembly steps and the resultant manufacturing costs. Furthermore, cam groove 28 of cam mechanism 10 is formed directly in arm portion 3a of support frame 3 to further contribute to the reduction of the number of components of the cam mechanism and the number of assembly steps. Also, guide grooves 23 and 24 and card guide portions 5 and 6 are provided on support frame 3 so that the support frame is used efficiently and cost-effectively within the eject device. Cam mechanism 10 also includes cam groove 28 provided on the support frame 3, pin plate 30 and pin 31 adapted to be inserted into cam groove 28, leaf spring 29 (spring member) for pushing pin plate 30 toward cam groove 28, and coil spring 26 for biasing slide member 22 in the direction of return to the retracted position. Furthermore, support frame 3 is made of a molded resin so that guide grooves 23 and 24 and card guide portions 5 and 6 can be formed during the molding process of the frame. Furthermore, since support frame 3 is made of resin, conductive terminals 9a of connector portion 9, including card connector 7 and substrate connector 8, may be assembled directly into the support frame 3.

In conclusion, in the card connector assembly according to the present invention, the eject device is assembled directly into the support frame to thereby make it possible to reduce the number of components, the number of assembly steps and the consequent manufacturing and inventory costs of the overall connector assembly.

It is understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A card connector assembly (1) for receiving and ejecting two generally planar inserted card member comprising a U-shaped support frame (3) including two arm portions (3a) provided on opposing sides of the support frame for guiding the card members into engagement with the card connector assembly; and a connector portion (9) having contacts (9a) for making contact with corresponding contacts of the card members; and two eject devices (2) for ejecting the card members, each said eject device assembled on a portion of one of the arm portions of the support frame and including a slide member (22) slidably moveable along said support frame, a push button (21) formed integrally with one end of the slide member, a movable lever (35) pivotably mounted on the support frame for moving said card in a direction away from the connector portion, and a cam mechanism (10) defining the movement of the slide member within the support frame, wherein a portion of said cam mechanism is provided directly on said support frame; characterized in that the cam mechanism includes a first cam groove (28) formed integrally with one of the arm portions, a first pin plate (30) having a first pin (31) movable within said cam groove, a first spring member (29) for holding the pin plate relative to said cam groove, a first coil spring (26) for biasing the slide member toward a retracted position, and a first holder portion (22*c*) formed in a recess in the slide member for holding said first pin plate within the cam groove, wherein a rib portion (33) having two generally parallel surfaces substantially parallel to the inserted card members extends outwardly from a side surface of said arm portion, and said first cam groove is formed in one of the surfaces of the rib portion such that the first cam groove is formed parallel to the planes of the inserted card members.

2. The card connector assembly according to claim 1, wherein said slide member further includes a first reception recess (22*b*) formed in a recess in the slide member for holding and substantially enclosing said first coil spring.

3. The card connector assembly according to claim 1, wherein a second cam groove is formed in the other of the surfaces of the rib portion such that it is formed and extends parallel to the first cam groove.

* * * * *